United States Patent
Conti et al.

(10) Patent No.: US 7,344,083 B1
(45) Date of Patent: Mar. 18, 2008

(54) STRAP CLIP

(75) Inventors: Brian Vincent Conti, Matthews, NC (US); Larry Keith Hooks, Charlotte, NC (US); Gregory Jon Payne, Charlotte, NC (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 433 days.

(21) Appl. No.: 11/216,775

(22) Filed: Aug. 31, 2005

(51) Int. Cl.
*G06K 7/10* (2006.01)

(52) U.S. Cl. .......................... 235/472.01; 235/462.43; 235/486

(58) Field of Classification Search .......... 235/472.01; 248/23.1, 230.7, 309.1, 316.1, 316.7; 24/3.7, 24/3.11, 3.9, 3.12
See application file for complete search history.

(56) References Cited

U.S. PATENT DOCUMENTS

| | | | | |
|---|---|---|---|---|
| 4,654,631 A | * | 3/1987 | Kurcbart et al. ........... | 340/7.63 |
| 5,218,187 A | * | 6/1993 | Koenck et al. ............. | 235/375 |
| 6,081,695 A | * | 6/2000 | Wallace et al. ............ | 455/575.6 |
| 2001/0002691 A1 | * | 6/2001 | Trana ....................... | 248/220.21 |
| 2004/0204169 A1 | * | 10/2004 | Goradesky ................ | 455/569.1 |

* cited by examiner

*Primary Examiner*—Steven S. Paik
*Assistant Examiner*—Tuyen Kim Vo

(57) ABSTRACT

A clip is described for securing a strap to a housing having a slot for receiving the clip and a feature near the slot. The clip comprises a tab, a loop and a cover. The tab is shaped to fit in the slot on the housing. The loop defines an opening to receive a strap, at least a portion of the loop extending away from the housing to provide clearance for the strap. The cover is shaped to fit over the feature when the tab is inserted in the slot, the cover extending at an angle to the tab. In another embodiment, a clip is described as comprising a loop and tab. The loop defines an opening to receive a strap. The tab is shaped to fit in a slot on a housing, the tab having a first end attached to and spaced from a first edge of the loop, a second end of the tab extending in the same general direction as the loop, wherein the gap between a portion of the loop closest to the second end of the tab and the second end of the tab is less than the gap between the first edge of the loop and the first end of the tab such that when the tab is pressed into the slot, the second end of the tab is flexed away from the second end of the loop.

2 Claims, 5 Drawing Sheets

STRAP CLIP

BACKGROUND OF THE INVENTION

Portable data terminals (PDT) are a type of data collection device used to collect, interpret, process, and ultimately transfer data to a larger data processing system. PDTs generally comprise a mobile computer, a keypad, and a data capture device. It is to be noted that some PDT's utilize more durable or "industrial" versions of their constituent components. The mobile computer generally comprises a hand held (or "pocket") computing device, such as those available from PALM, HEWLETT PACKARD, and DELL. Keypads come in a variety of alpha-numeric and numeric configurations. The data capture device generally comprises a device that captures data from, for example, radio frequency IDs (RFID), images and/or bar codes. Data may also be captured via keypad entry and utilization of a touch pad associated with the mobile computer. PDT's are available from several sources, including the assignee of the present application: HAND HELD PRODUCTS, INC.

FIG. 1a is an orthogonal view of a known PDT 102. In particular, FIG. 1a illustrates an example of a popular form factor comprising an elongated bar shape. The PDT 102 comprises a battery (not shown), an LCD with touch screen 106, a keyboard 108, and a scan engine 110. The scan engine 110 may comprise, for example, an image engine or a laser engine. An adjustable strap 118, secured at two points on a back side of the PDT 102, is provided to assist with holding the PDT 102 and to thereby avoid damaging the PDT 102. In particular, the adjustable strap 118 facilitates a secure one-handed grip.

In use, a scan key 116 initiates an image capture via the image engine 110. The captured image is analyzed, e.g. decoded, to identify the data it represents. The decoded data is stored on the PDT 102 and made available to data processing resources contained therein.

FIG. 1b is a bottom view of a known PDT 102. Integration of the strap 118 may be accomplished through the use of a molded recess and a bar extending across the recess. The bar may be formed as part of the molded shell or provided as a separate bar (plastic, metal or wire) captured by the molded shell. It is also known to use a clip that is press (or loosely) fit into a slot, such as the slot 120. FIG. 1c is a bottom view of a known PDT 102 with a known strap clip 122 secured in place by a biasing force exerted by the strap 118. Typically, such a clip is only used to secure one end of a strap.

FIGS. 1b and 1c also illustrate the use of a connector 124 on a bottom surface of the PDT 102. The connector 124 may be used for charging of and/or communication with the PDT 102. Typically, such communication involves retrieving decoded (and possibly processed) data from the PDT 102.

BRIEF DESCRIPTION OF THE DRAWINGS

An understanding of the present invention can be gained from the following detailed description of the invention, taken in conjunction with the accompanying drawings of which.

DETAILED DESCRIPTION

Figure 1A:
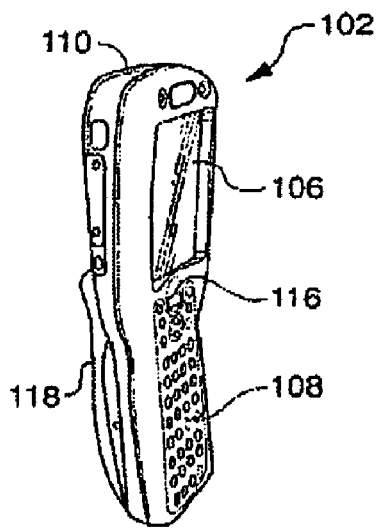
FIG. 1a is an orthogonal view of a known PDT.
Figure 1B:
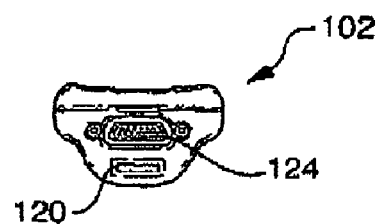
FIG. 1b is a bottom view of a known PDT.
Figure 1C:
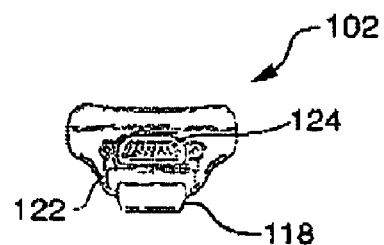
FIG. 1c is a bottom view of a known PDT with a known strap clip.

Reference will now be made in detail to the present invention, examples of which are illustrated in the accompanying drawings, wherein like reference numerals refer to like elements throughout. The following description will use nomenclature associated with a PDT, however those of ordinary skill in the art will recognize that the present invention is applicable to a variety of other portable devices including personal data assistants (PDAs); bar code scanners, consumer electronics (including portable radios, televisions and phones), and the like. It is anticipated that many such portable devices would benefit from the present invention, including the embodiments thereof described herein.

Figure 2A:
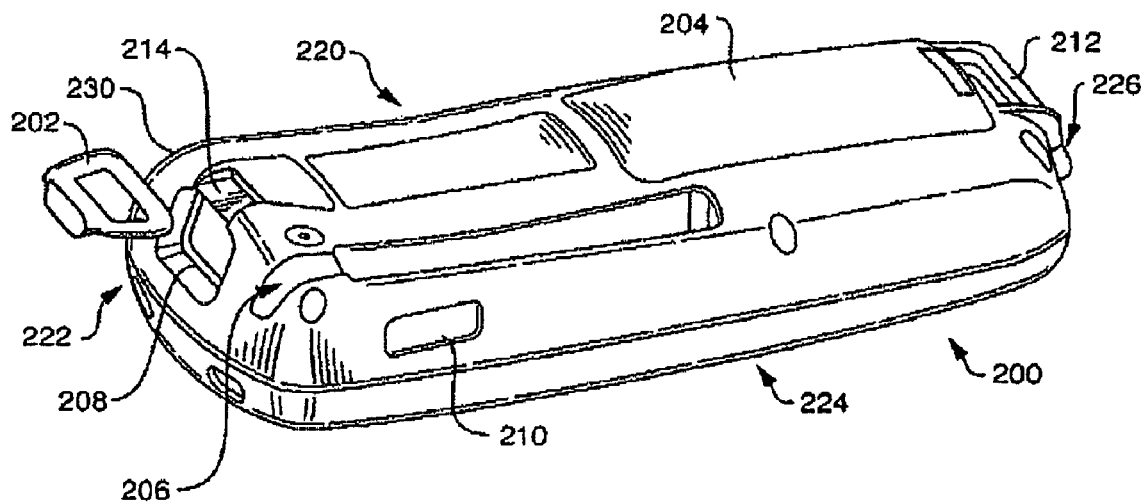
FIG. 2a is an orthogonal exploded view of a PDT and a strap clip in accordance with at least one embodiment of the present invention.

FIG. 2a is an orthogonal exploded view of a PDT 200 and a strap clip 202 in accordance with at least one embodiment of the present invention. In general, FIG. 2a illustrates a rear surface 220, a top surface 222, a first side surface 224, and part of a bottom surface 226. A front surface and a second side surface are obfuscated by the viewing angle. The illustrated PDT 200 has many feature commonly found on available PDT's including: a battery compartment cover 204; a receptacle 206 for a stylus; an opening 208 for an imaging unit; and side buttons 210. In addition, the PDT 200 is provided with an exposed bar 212 in association with a bottom surface 226 for securing one end of a strap (not shown). The other end of the strap is secured by the clip 202 which, during use, is inserted into a slot 214 located near the intersection of the rear surface 220 and the top surface 222.

Figure 2B:
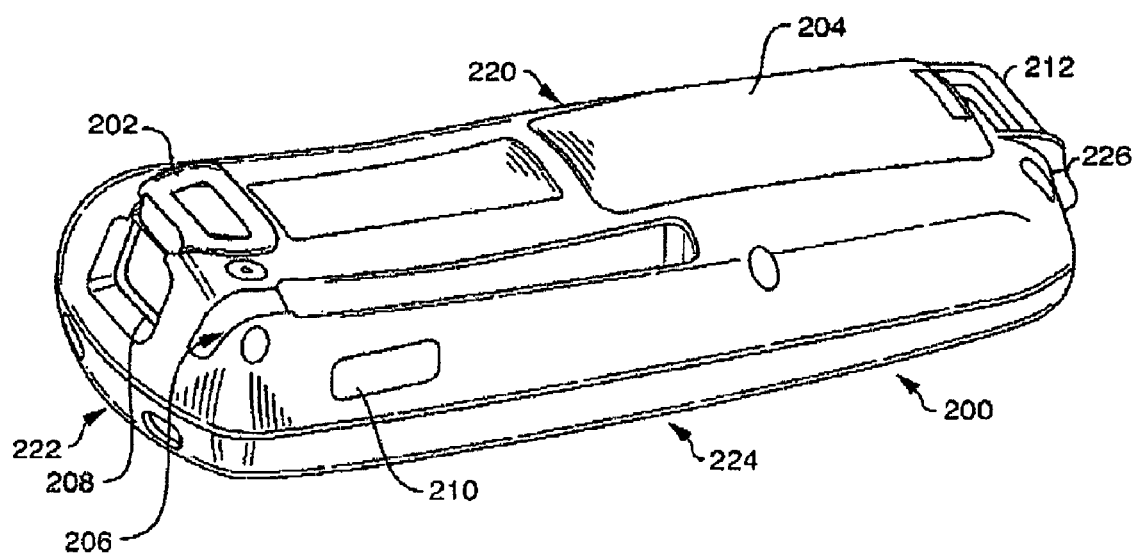
FIG. 2b is an orthogonal view of a PDT and strap clip, as assembled, in accordance with at least one embodiment of the present invention.

FIG. 2b is an orthogonal view of a PDT 200 and strap clip 202, as assembled, in accordance with at least one embodiment of the present invention. The strap clip 202, designed to be easily inserted and removed by a user, is secured in slot 214. A hand strap (not shown) is subsequently extended between the clip 202 and the exposed bar 212. The hand strap preferably comprises an elastic fabric with hook and loop fabric attached thereto so as to enable securing of the hand strap by looping an end through the clip 202.

The housing of the PDT 200 is formed using injection molding. Referring to FIG. 2a, the slot 214 on the rear surface 220 is typically formed as an undercut. Undercuts are formed using tool action, e.g. a piece of tooling pulled perpendicular to the separation motion of major mold halves. The pulling motion of the tooling results in a flat featureless interior. As strap clips tend to be rather small and easily lost, it is desirable to provide a snap fit both to secure the strap clip and to assure the user that the strap clip is secure. Such a snap fit will also prevent the strap clip from falling out when the biasing force provided by the strap is removed. However, as noted, the slot 214 is formed with straight walls meaning that no indentations are provided to facilitate a snap fit.

Figure 3A:
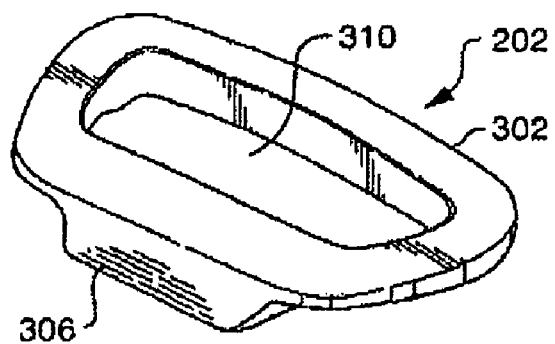
FIGS. 3a, 3b, and 3c are views of strap clip according to at least one embodiment of the present invention.
Figure 3B:
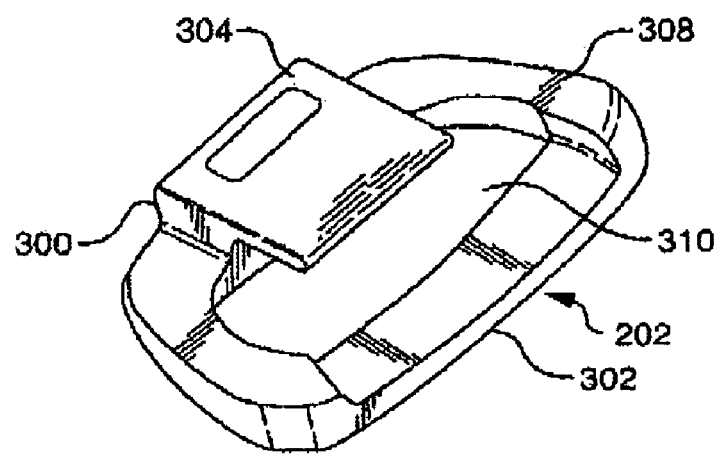
Figure 3C:
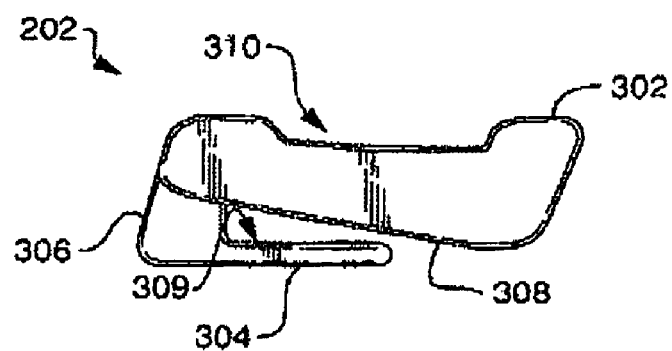

FIGS. 3a, 3b, and 3c are views of strap clip 202 according to at least one embodiment of the present invention. The strap clip 202 generally comprises a loop 302 secured to a tab 304 by a neck 306. The loop defines a hole 310 adapted to receive and secure a strap (not shown). A lower surface 308 of loop 302 and the upper surface 309 of the tab 304 form an acute angle such that the exposed end of the tab 304 is closer to the exposed end of the loop 302 than the distance between the respective opposite ends (connected by the neck 306). Referring once again to FIG. 2a, the rear surface 220 of the PDT 200 is provided with a ridge 230 traversing the opening 214 across a short axis of the PDT 200. The ridge 230 slopes toward the center of mass of the PDT 200; meaning that the surface of the housing is further from the slot 214 at the opening of the slot 214 that at the opposite end of the slot 214. The distance between the closer surface of the slot 214 and the top of the ridge 230 at or near the opening of the slot 214 is preferably greater than the distance between the upper surface 309 at the end of the tab 304 and the lower surface 308 of the loop 302. It is to be understood that any of the relevant surfaces may be chamfered to ease insertion of the tab 304 into the slot 214.

As the tab 304 of the strap clip 202 is inserted into the opening 214, the free end of the loop 302 is biased away from the free end of the tab 304 by the ridge 230. As the strap clip 202 is further inserted, the bias against the exposed end of the loop is reduced as the distance between the slot and the rear surface 220 of the PDT 200 is reduced. By adjusting the slopes of the lower surface 308 of the loop 302 and the ridge 230, different "feels" can be generated. For example, by making the slope of the ridge 230 (with respect to the slot 214) greater than the slope of the lower surface 308 (with respect to the upper surface 309 of the tab 304), a snap fit can be achieved.

Figure 4A:
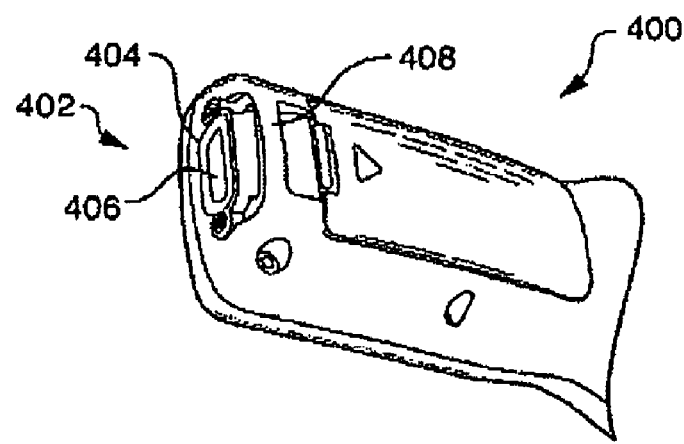
FIG. 4a is a partial orthogonal view of the bottom surface of a PTD.

FIG. 4a is a partial orthogonal view of a bottom 402 of a PTD 400. The bottom 402 includes an opening 404 exposing a connector 406. The connector 404 may be any of a variety of connectors used, for example, to communicate with the PDT 400 and/or charge the PDT 400. A slot 408 is formed in the bottom surface. The slot 408 has an opening extending across the short axis of the PDT 400 and extends under a rear surface of the PDT 400 along and roughly parallel to the long axis of the PDT 400. In the embodiment shown in FIG. 4a, the slot is open on both ends to facilitate use of a strap with or without a strap clip.

Figure 4B:
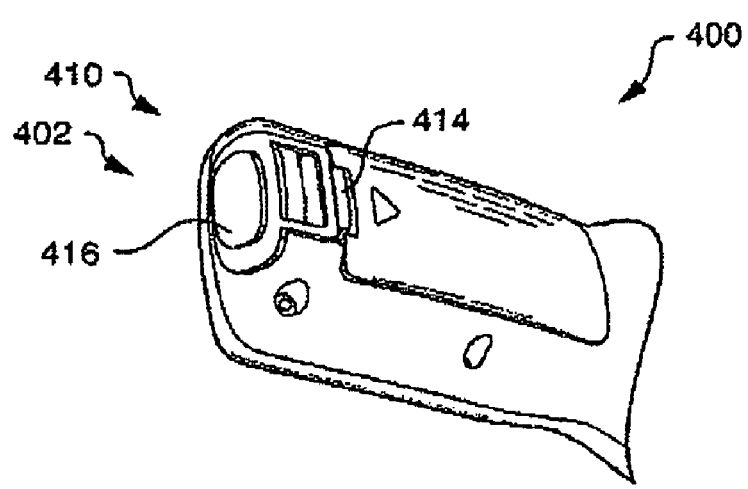
FIG. 4b is a partial orthogonal view of a PDT with a strap clip installed in accordance with at least one embodiment of the present invention.
Figure 5A:
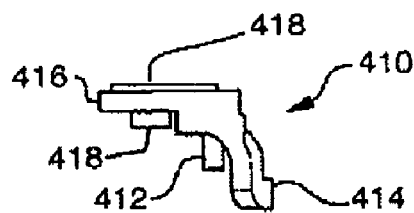
FIGS. 5a, 5b, 5c, and 5d are views of strap clip according to at least one embodiment of the present invention.
Figure 5B:
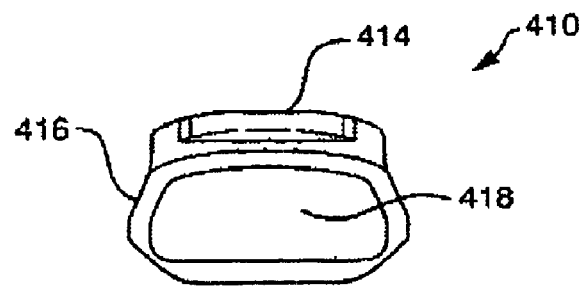
Figure 5C:
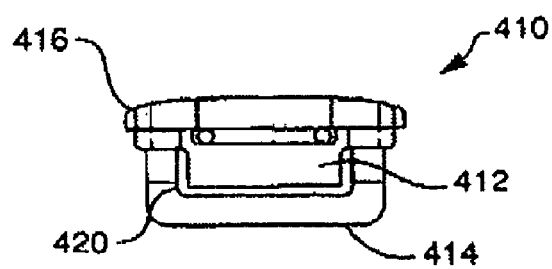
Figure 5D:
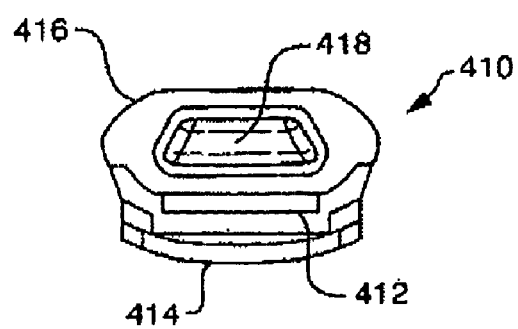

FIG. 4b is an orthogonal view of a PDT 400 with a strap clip 410 installed in accordance with at least one embodiment of the present invention. In the embodiment shown in FIG. 4b, the strap clip 410 may be loosely or press fitted into the slot 408 and retained in the slot 408 by a biasing force applied by the strap (not shown). Alternatively, the fit may be adjusted in accordance with the teachings described hereinabove. The strap clip 410 may be formed of injection molded plastic and generally comprises a tab 412 (not visible) for insertion into the slot 408, a loop 414 that receives and secures a strap (not shown) and a cover 416 that protects the opening 440 (and the connector 442).

FIGS. 5a, 5b, 5c, and 5d are views of strap clip 410 according to at least one embodiment of the present invention. The loop 414 generally extends perpendicular to the cover 416 and defines an opening 420 through which a strap (not shown) may pass. The loop 414 may be curved to generally match the exterior curves of the PDT 400. The cover 416 may be augmented with a rubber plug 418 to assist with protecting the opening 404 (and connector 406) from the elements. The interior surface (e.g. that surface which mates with the opening 404) of the rubber plug 418 may be generally shaped to overlap the opening 404 with a protrusion that fits into the opening 404 against the connector 406. The plug 418 may extend through the thickness of cover 416 to both exterior surfaces so as to provide a tactile feel to the user. The tab 412 extends generally parallel with the loop and is sized to mate with the slot 404.

In use, the tab 412 is inserted into the slot 408 in such a manner that the cover 416 overlays the opening 404. A strap is looped through the opening 420 and secured. As noted the strap clip 410 may be retained in place using the biasing force of the strap.

Although some embodiments of the present invention has been shown and described, it will be appreciated by those skilled in the art that changes may be made in these embodiments without departing from the principles and spirit of the invention, the scope of which is defined in the claims and their equivalents. For example, either or both of the strap clips described herein may be utilized on peripherals associated with the portable devices to which the strap is primarily associated. This would provide a common operating mode and the possibility to using a single strap for multiple devices (particularly useful when a strap is lost or broken in the field). By way of another example, the loop of the first embodiment may incorporate an angle to narrow the gap with the tab.

What is claimed is:

1. A portable data terminal comprising:
   a display;
   a touch screen associated with the display;
   a keyboard;
   a scan engine;
   a housing that integrates the display, touch screen, keyboard, and image engine, the housing having a slot;
   a strap; and
   a clip having a loop defining an opening to receive the strap and a tab shaped to fit in the slot on the housing, the tab having one end fixed to the loop and extending toward the opening at an angle to the loop, such that when the tab is pressed into the slot, a free end of the tab is flexed away from the loop.

2. A portable data terminal comprising:
   a display;
   a touch screen associated with the display;
   a keyboard;
   a scan engine;
   a housing that integrates the display, touch screen, keyboard, and image engine, the housing a having an opening and a slot situated near the opening;
   a connector situated in the opening;
   a strap; and
   a clip having a cover shaped to fit over the opening the housing, a loop defining an opening to receive the strap, a tab shaped to fit in the slot on the housing; and
   wherein when the tab is inserted into slot, the cover protects the connector.

* * * * *